United States Patent
Miller et al.

(10) Patent No.: US 9,341,126 B2
(45) Date of Patent: May 17, 2016

(54) ADJUSTMENTS FOR ENGINE SPARK USING REMOTE DATA

(71) Applicant: Ford Global Technologies, LLC, Dearborn, MI (US)

(72) Inventors: Kenneth James Miller, Canton, MI (US); Douglas Raymond Martin, Canton, MI (US); Kenneth J. Jackson, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 133 days.

(21) Appl. No.: 14/276,044

(22) Filed: May 13, 2014

(65) Prior Publication Data

US 2015/0330320 A1    Nov. 19, 2015

(51) Int. Cl.
| | |
|---|---|
| *B60W 10/06* | (2006.01) |
| *B60W 10/10* | (2012.01) |
| *F02D 35/02* | (2006.01) |
| *B60W 30/188* | (2012.01) |
| *F16H 61/02* | (2006.01) |

(52) U.S. Cl.
CPC ............. *F02D 35/027* (2013.01); *B60W 10/06* (2013.01); *B60W 10/10* (2013.01); *B60W 30/1882* (2013.01); *F16H 61/0213* (2013.01); *F16H 2061/0232* (2013.01)

(58) Field of Classification Search
None
See application file for complete search history.

(56) References Cited

U.S. PATENT DOCUMENTS

| | | | |
|---|---|---|---|
| 5,553,661 A | 9/1996 | Beyerlein et al. | |
| 7,156,168 B2 | 1/2007 | Gutbrod et al. | |
| 8,330,591 B2 | 12/2012 | Ziehr | |
| 8,882,634 B2 * | 11/2014 | Banker | B60W 10/196 477/5 |
| 2006/0190155 A1 * | 8/2006 | Meyer | B60W 50/0098 701/54 |
| 2007/0131782 A1 | 6/2007 | Ziehr et al. | |
| 2012/0173075 A1 * | 7/2012 | Mays | B60W 10/06 701/34.2 |
| 2012/0221216 A1 * | 8/2012 | Chauncey | B60R 16/0236 701/51 |
| 2013/0184966 A1 * | 7/2013 | Lockwood | F02D 29/02 701/102 |
| 2013/0226431 A1 * | 8/2013 | Lu | B60W 50/0098 701/96 |

FOREIGN PATENT DOCUMENTS

| | | |
|---|---|---|
| DE | 10151801 | 4/2003 |
| KR | 20050117864 | 12/2006 |
| WO | WO 03000513 | 1/2003 |

* cited by examiner

*Primary Examiner* — Edwin A Young
(74) *Attorney, Agent, or Firm* — Frank A. MacKenzie; Bejin Bieneman PLC

(57) ABSTRACT

External data from a second computer external to a vehicle is received in an in-vehicle computer comprising a processor and a memory. At least one derived datum is generated from at least some of the external data. The at least one derived datum is used to make an adjustment to engine performance.

20 Claims, 2 Drawing Sheets

ADJUSTMENTS FOR ENGINE SPARK USING REMOTE DATA

BACKGROUND

Engine spark can be affected by humidity, among other factors. For example, various humidity levels, possibly depending on other factors such as an ambient temperature, can increase or decrease the propensity for knock, i.e., mistimed combustion of fuel, in an internal combustion engine. A vehicle engine controller or the like can adjust the timing of ignition of spark plug, pressure in a cylinder, etc., to improve engine spark conditions, i.e., reduce knock. However, sensors and the like used to determine humidity and other factors may be impose costs in terms of weight, size, money, etc., when used in a vehicle. Further, even if cost obstacles are overcome, in-vehicle sensors may not measure humidity and other factors with a desired accuracy for making adjustments to optimize engine spark.

DRAWINGS

DETAILED DESCRIPTION

System Overview

Figure 1:
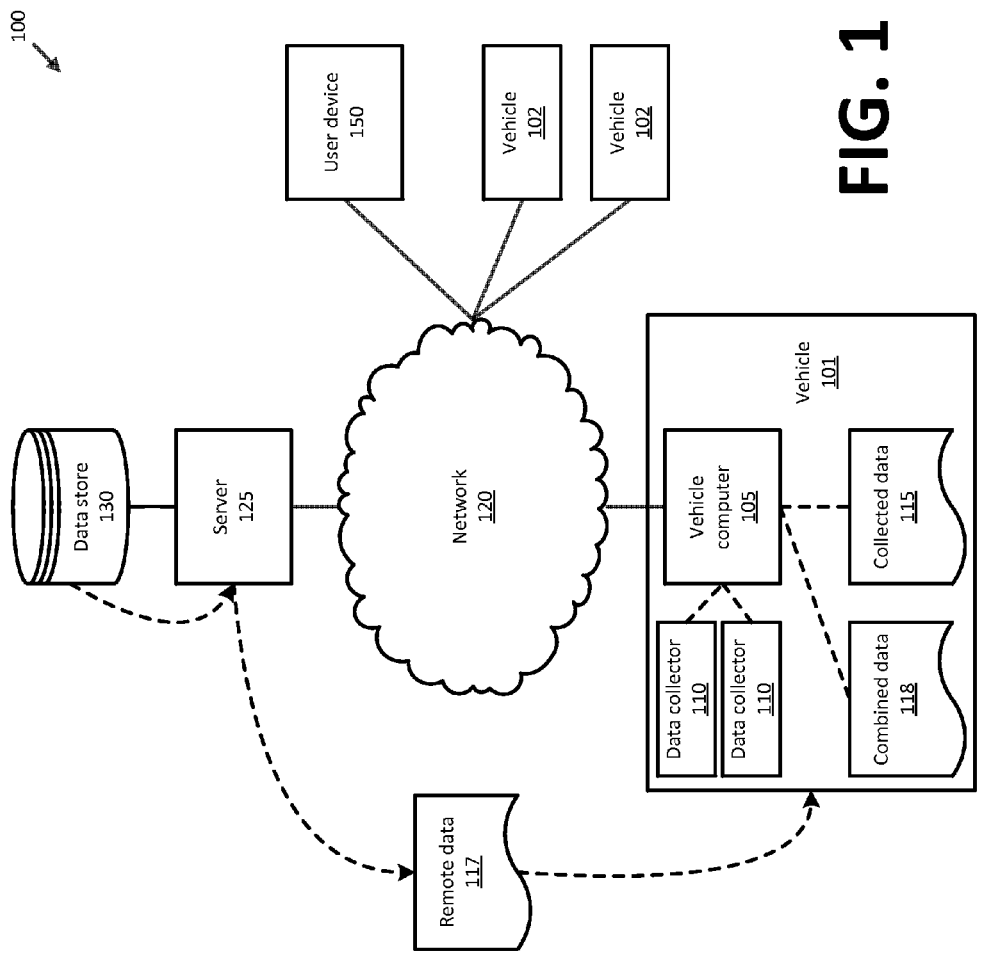
FIG. 1 is a block diagram of an exemplary system for obtaining and data, including from a remote source, to make adjustments to optimize engine spark.

FIG. 1 is a block diagram of an exemplary system 100 for obtaining data 117 in a vehicle 101 computer 105 from at least one remote source such as a remote server 125 and/or a user device 150. Further in the context of the system 100, the computer 105 may use data 117, possible alone but sometimes in combination with data 115 from data collectors 110 in the vehicle 101, thereby generating derived data 118, which may then be used to make adjustments to optimize conditions for engine spark. The data 115, 117, 118 can relate to environmental, e.g., weather, conditions such as temperature, humidity, etc., that can be relevant to adjusting an engine to promote engine spark.

System Elements

A vehicle 101 computer 105 generally includes a processor and a memory, the memory including one or more forms of computer-readable media, and storing instructions executable by the processor for performing various operations, including as disclosed herein. The memory of the computer 105 further generally stores remote data 117 and collected data 115. The computer 105 is configured for communications on a controller area network (CAN) bus or the like, and/or other wire or wireless protocols, e.g., Bluetooth, etc., i.e., the computer 105 can communicate via various mechanisms that may be provided in the vehicle 101. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including one more user devices 150, data collectors 110. In addition, the computer 105 may be configured for communicating, e.g., with one or more remote servers 125, with the network 120, which, as described below, may include various wired and/or wireless networking technologies, e.g., cellular, Bluetooth, wired and/or wireless packet networks, etc.

Data collectors 110 may include a variety of devices, e.g., cameras, radar, lidar, ultrasonic sensors, accelerometers etc. For example, various controllers in a vehicle may operate as data collectors 110 to provide data 115 via the CAN bus, e.g., data 115 relating to vehicle speed, acceleration, location, etc., in addition to environmental conditions such mentioned above. Further, sensors or the like, global positioning system (GPS) equipment, etc., could be included in a vehicle and configured as data collectors 110 to provide data directly to the computer 105, e.g., via a wired or wireless connection.

Collected data 115 may include a variety of data collected in the vehicle 101, including the examples listed above. Data 115 is generally collected using one or more data collectors 110, and may additionally include data calculated therefrom in the computer 105. In general, collected data 115 may include any data that may be gathered by a collection device 110 and/or computed from such data, and that may be relevant to engine spark or engine knock. For example, collected data 115 may include an under-hood temperature, an air charge temperature, ambient temperature around the vehicle 101, humidity measurements, etc. In general, as noted below, a datum 115 is generally associated with a particular point in time. Specific examples of data collectors 110, and data 115 respectively collected thereby, include:

- air mass sensor collecting readings of air mass (AM) in an engine cylinder;
- engine coolant temperature sensor collecting an engine coolant temperature ($ECT_{sensor}$);
- cylinder head temperature (CHT) sensor collecting an cylinder head temperature (CHT);
- air charge temperature sensor collecting an air charge temperature (ACT);
- under-hood temperature sensor collecting an under-hood temperature ($T_{under\text{-}hood}$).
- ambient (outside) temperature sensor collecting an ambient temperature ($T_{ambient\_sensor}$);
- barometric pressure sensor collecting a barometric pressure ($BP_{sensor}$);
- relative humidity sensor collecting a relative humidity ($Humidity_{sensor}$);
- precipitation sensor collecting a rate of precipitation ($Precipitation_{sensor}$);
- speed sensor collecting a vehicle 101 speed (i.e., velocity) ($Velocity_{vehicle\_sensor}$).
- Road grade (describing a road angle to the horizon) inferred from $Velocity_{vehicle\_sensor}$ and a power reported being transmitted to a vehicle 101 powertrain ($Road\_grade_{inferred}$);
- an inferred fuel type (i.e., percent methanol) used in the vehicle 101, e.g., based on a knock sensor using known techniques, e.g., if knock at lower loads have lower octane fuel;
- inferred fuel octane rating;
- sounds detected by an engine knock sensor 110;
- engine speed, e.g., in revolutions per minute (RPM);
- load, i.e., percentage that cylinder is filled, i.e., air mass adjusted for RPMs, e.g., twice as much air mass is required at 2000 RPMS as at 1000 RPMs (knock generally occurs at high loads);
- cylinder head temperature (sometimes engine temperature is used as a surrogate);
- a current timing for vehicle 101 spark plug ignition; and/or
- an altitude of the vehicle 101 (e.g., obtained from GPS data 115).

Remote data 117 may include various measurements including a measurement of humidity a location near or surrounding a vehicle 101. For example, generally available weather data or the like, such as could be provided from a remote source such as a server 125, a user device 150, etc., typically includes a relative humidity. Likewise, data 117 could include a ambient temperature and/or other data that could influence the effect of humidity on engine spark and/or engine knock. For example, an angle of the sun with respect to a location of the vehicle 101, presence of cloud cover, etc. could be relevant. Additional specific examples of remote data 117 are provided below. In general, use of remote data 117 may allow for savings of weight and cost in the vehicle 101 by allowing certain data collectors 110 to be omitted from the vehicle 101. Additionally or alternatively, use of remote data 117, in combination with collected data 115, may allow for beneficial redundancy and/or greater reliability than is possible using in-vehicle data 115 alone.

Remote data 117, could be provided via the network 120 to the computer 105 from a data store 130 associated with a remote server 125. Alternatively or additionally, a remote source providing remote data 117 could be a second vehicle 102, e.g., communicating with the vehicle 101 using a protocol for vehicle-to-vehicle communications, e.g., Dedicated Short Range Communications (DSRC) and/or some other protocol. As mentioned above, remote data could include environmental information, e.g., weather information such as temperature, humidity, barometric pressure, wind direction and speed, wind chill, presence of precipitation, presence of cloud cover, sun angle(s) at a given time or times of day, etc. Specific examples of remote data 117 include, where the signifier "cloud" is sometimes used to signify "cloud" or remote data 117, such data provided to the computer 105 from the server 125 or the like according to an area in which the vehicle 101 is travelling:

- ambient temperature ($T_{ambient\_cloud}$)
- barometric pressure ($BP_{cloud}$)
- altitude;
- relative humidity ($Humidity_{cloud}$);
- rate of precipitation ($Precipitation_{cloud}$);
- sun load
- angle of sun load with respect to ambient temperature sensor ($A_{sunload}$);
- road grade, e.g., an angle to the horizon of a road ($Road\_grade_{gps}$);
- wind velocity ($V_{wind}$);
- wind direction
- vehicle speed according to use of the global positioning system ($V_{gps}$).

Based on collected data 115 and remote data 118, the computer 105 may generate derived data 118, as stated above. Examples of formulae by which derived data 118 may be generated, and examples of derived data 118, include:

$$vehicle\ 101\ velocity\ V_{derived} = k1*V_{vehicle\_sensor} + k2*V_{gps};$$

$$road\_grade_{derived} = k1*road\_grade_{inferred} + k2*road\_grade_{gps};$$

$$ECT_{derived} = k1*ECT_{sensor} + k2*T_{ambient}*k3*road\_grade_{derived};$$

$$T_{engine\_cylinder\_head} = k1*CHT_{sensor} + k2*T_{ambient}*k3*road\_grade_{derived};$$

$$ACT_{derived} = k1*T_{ambient} + k2*T_{under\_hood} + k3*V_{derived} + k4*V_{wind} + k5*AM;$$

$$T_{ambient} = (k1*T_{ambient\_sensor} + k2*T_{ambient\_cloud})*k3*Sunload - k4*(T_{ambient\_sensor}*\cosine(A_{sunload}));$$

$$BP_{derived} = k1*BP_{sensor} + k2*BP_{cloud};$$

$$Humidity\ Sensor = k1*Humidity_{sensor} + k2*Humidity_{cloud} + k3*Precipitation_{sensor}.$$

The above formulae include constants k1, k2, etc. These constants generally have values, i.e., provide weights, between zero and one, and or have other values to provide an adjustment factor or the like. Appropriate values may be empirically determined.

Alternatively or additionally, the values of the constants may be determined based on results of diagnostic processes, sometimes referred to as rationality tests, applied to data collectors 110 and/or data 115 therefrom, as well as to remote data 117. For example, a data value 115 associated with a sensor 110 indicated to be unreliable, or a data value 115, 117 itself evaluated to be unreliable, could then be assigned a weight of zero, i.e., such that the value 115 or 117 would not be taken into account. Likewise, a constant associated with a value 115 or 117 could be assigned a value of one where related data 115 or 117 is unreliable, e.g., is associated with a constant having a value of zero. For instance, in the exemplary equation for vehicle 101 velocity $V_{derived}$ given above, if a vehicle velocity sensor 110 indicated a fault or vehicle velocity data 115 was otherwise indicated to be unreliable, then the constant k1 could be assigned a value of zero, and the constant k2 could be assigned a value of one.

Data values 115, 117 could be subjected to one or more rationality diagnostics. For example, a threshold rationality diagnostic could be applied to determine whether a value 115 or 117 was within a possible range, e.g., if a value 115 or 117 was outside of any recorded or known value, e.g., an ambient temperature of below −50 degrees Fahrenheit or above 150 degrees Fahrenheit, then a constant for $T_{ambient\_sensor}$ or $T_{ambient\_cloud}$, as appropriate, could be set to zero. If a data value 115 or 117 fails a threshold rationality diagnostic, then no further diagnostics are generally necessary.

Further, as an alternative or in addition to a threshold rationality diagnostic, e.g., once a value 115, 117 had passed a threshold rationality diagnostic, then one or more additional particularized rationality diagnostics i.e., a rationality diagnostic for a particular kind of data 115 or 117, could be applied. Examples of particularized rationality diagnostics include:

- If $V_{vehicle\_sensor}$ and $V_{gps}$ disagree by more than a specified threshold, use the value 115 or 117 that is within the legal speed limit, or, if both or neither are within the legal speed limit, then use the value 115 117 closest to the legal speed limit;
- If $road\_grade_{inferred}$ and $road\_grade_{cloud}$ disagree by more than a specified threshold, then average them, e.g., set k1=0.5, k2=0.5;
- If ambient temperature sensors $T_{ambient}$ and $T_{ambient}$ cloud disagree by more than a specified threshold, then use which is closest to measured ACT when $V_{derived}$>45 mph;
- If $BP_{sensor}$ and $BP_{cloud}$ disagree by more than a specified threshold, then use whichever is closest to the standard BP corresponding to an altitude obtained from current GPS data;
- If $Humidity_{sensor}$ and $Humidity_{cloud}$ disagree by more than a specified threshold, then use the lower value 115 117.

Returning to FIG. 1, the network 120 represents one or more mechanisms by which a vehicle computer 105 may communicate with a remote server 125, including to obtain remote data 117. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various of the steps and processes described herein. The server 125 may include or be communicatively coupled to a data store 130 for storing remote data 115.

Alternatively or additionally, as mentioned above, in addition to the one or more servers 125, a remote source may include one or more computing devices in one or more second vehicles 102. Such vehicle computers may be configured to communicate via the network 120 and/or other mechanisms, such as according to vehicle-to-vehicle communication protocols or the like. That is, sensors or the like in a second vehicle 102 could make a measurement, e.g., an environmental measurement related to precipitation, ambient temperature, humidity, etc., and provide such measurement to a first vehicle 101.

A user device 150 may be any one of a variety of computing devices including a processor and a memory, as well as communication capabilities. For example, the user device 155 may be a portable computer, tablet computer, a smart phone, etc. that includes capabilities for wireless communications using IEEE 802.11, Bluetooth, and/or cellular communications protocols. Further, the user device 155 may use such communications capabilities to communicate via the network 120 and also directly with a vehicle computer 105, e.g., using an in-vehicle communications mechanism, e.g., Bluetooth.

Exemplary Process Flow

Figure 2:
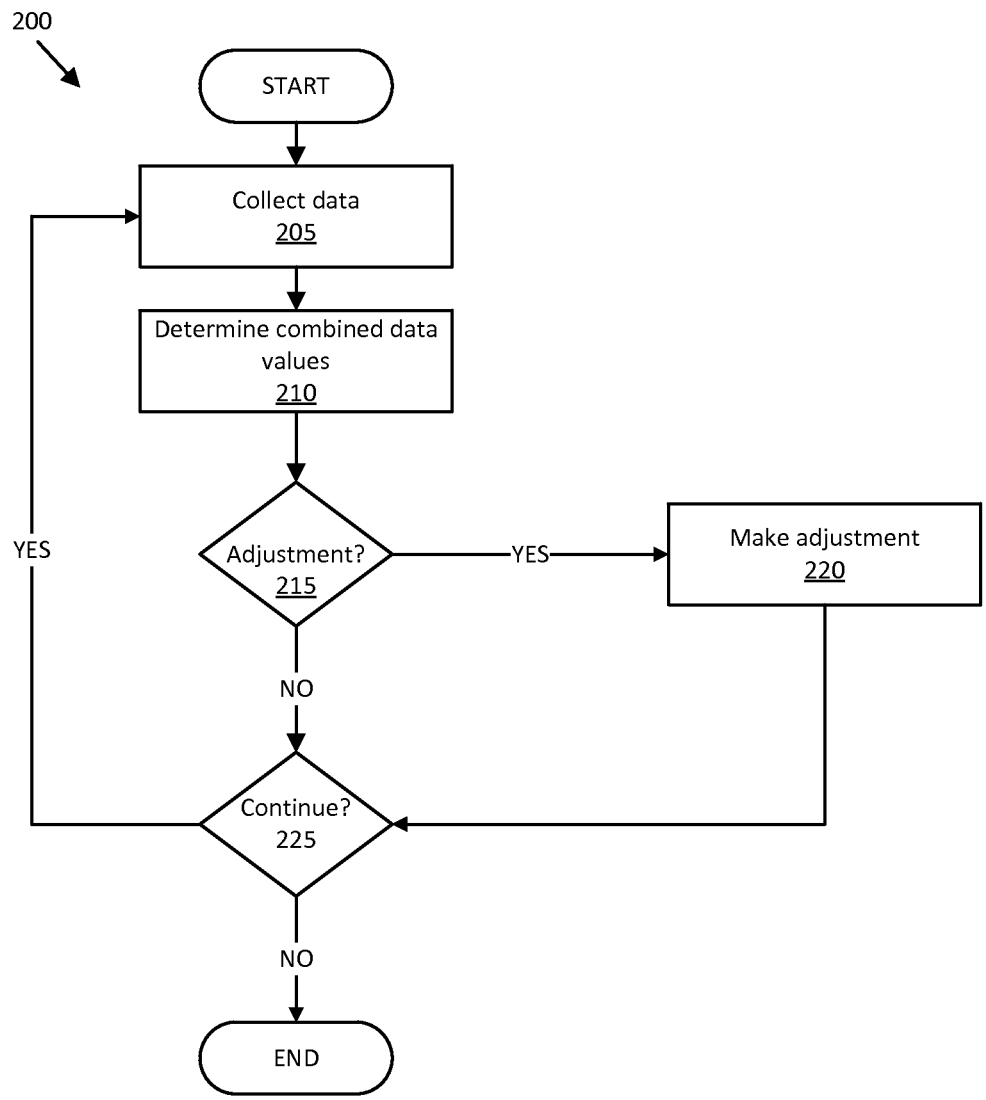
FIG. 2 is a diagram of an exemplary process for making adjustments to optimize engine spark.

FIG. 2 is a diagram of an exemplary process 200 for identifying and reporting rapid approach incidents.

The process 200 begins in a block 205, in which the vehicle 101 computer 105 collects data 117, and also generally data 115, for use in determining whether to make an engine spark adjustment. Data 117, 115 may include, for example, one or more data such as described above.

Next, in a block 210, the computer 105 determines one or more derived data 118 values potentially relevant to adjustments for proper engine spark. Such data 118 could include the examples provided above, and could be determined in various ways using data 117 and/or 115, e.g., as illustrated above. Further, one or more rationality diagnostics could be applied to data 115, 117, in generating data 118, as also explained above.

Following the block 210, in a block 215, the computer 105 determines whether an adjustment should be made to one or more controls affecting the vehicle 101 engine, e.g., affecting engine spark or some other factor, such as adjustments to a vehicle shift schedule, based on the derived data 118 generated in the block 210. For example, adjustments to engine spark could be made according to factors such as the following:

high temperatures, e.g., ambient temperatures, engine related temperatures such as $T_{engine\_cylinder-head}$, ACT, etc., could suggest retarding engine timing to reduce the possibility of engine knock, whereas lower temperatures could suggest advancing engine timing to optimize spark;

humidity, particularly when combine with temperature data, e.g., spark should be retarded in lower humidities and advanced in higher humidities;

a presence or absence of precipitation could affect a relative humidity value (e.g., in the presence of rain, a relative humidity value could be adjusted a predetermined amount, e.g., 10 percent, possibly also depending on an ambient temperature, e.g., a relative humidity value might be adjusted more in higher temperatures and less in lower temperatures);

a barometric pressure (which could be adjusted for altitude), e.g., a barometric pressure may affect engine performance because a barometric pressure could affect a pressure across a throttle plate in the vehicle 101, e.g., lower barometric pressures could mean lower pressures across a throttle plate.

Also, as mentioned above, adjustments to a shift schedule could be made. For example, a steep road grade, e.g., road_grade$_{derived}$, could suggest adjusting vehicle 101 gearing so as to increase revolutions per minute (rpm's) of the vehicle 101 engine, whereas a steep downward road grade could suggest decreasing RPMs. Likewise, engine RPMs could be adjusted for other factors, e.g., lower barometric pressures could suggest increasing RPMs, while higher barometric pressures could suggest decreasing engine RPMs.

If an adjustment should be made, then a block 220 is executed next. Otherwise, the process 200 proceeds to a block 225.

In the block 220, the adjustment determined in the block 215 is made.

In the block 225, which may follow either of the blocks 215, 220, the computer 105 determines whether the process 200 should continue. For example, the vehicle 101 may be powered off, user input could be received to stop the process 200, the computer 105 could lose connectivity with the network 120 and/or other mechanisms providing data 117 from remote sources, etc. In any event, if the process 200 should continue, then the block 205 is executed following the block 225. Otherwise, the process 200 ends following the block 225.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising an in-vehicle computer comprising a processor and a memory, wherein the in-vehicle computer is configured to:
   receive external data from a second computer external to the vehicle;
   generate at least one derived datum from at least some of the external data; and
   use the at least one derived datum to determine an engine adjustment to optimize conditions for engine spark; and
   make the engine adjustment.

2. The system of claim 1, wherein the engine adjustment is at least one of an adjustment to advance engine spark, to retard engine spark, and to alter a shift schedule.

3. The system of claim 1, wherein the engine adjustment is an adjustment to a shift schedule.

4. The system of claim 1, wherein the in-vehicle computer is further configured to receive internal data from one or more data collectors in the vehicle, and to generate the derived datum based on internal data in addition to the external data.

5. The system of claim 4, wherein the internal data include at least one of an ambient temperature, a barometric pressure, a relative humidity, precipitation data, a sun load, a road grade, a vehicle speed, an air mass in the vehicle engine, an engine coolant temperature, and an air charge temperature.

6. The system of claim 4, wherein the internal data is received via a controller area network (CAN) bus in the vehicle, and the external data is received via a wide area network.

7. The system of claim 1, wherein the external data include at least one of an ambient temperature, a barometric pressure, a relative humidity, precipitation data, a sun load, a road grade, a wind velocity, a wind direction, and a vehicle speed.

8. The system of claim 1, wherein the in-vehicle computer is further configured to perform a rationality diagnostic with respect to at least one of the external data and internal data prior to generating the at least one derived datum.

9. The system of claim 8, wherein the rationality diagnostic includes an initial threshold test to determine whether the at least one of the external data and the internal data fall within a possible range of values.

10. The system of claim 8, wherein the rationality diagnostic is used to adjust a weighting of the at least one of the external data and the internal data.

11. A method, comprising:
    receiving, in an in-vehicle computer comprising a processor and a memory, external data from a second computer external to the vehicle;
    generating at least one derived datum from at least some of the external data; and
    using the at least one derived datum to determine an engine adjustment to optimize conditions for engine spark; and
    making the engine adjustment.

12. The method of claim 11, wherein the engine adjustment is at least one of an adjustment to advance engine spark, to retard engine spark, and to alter a shift schedule.

13. The method of claim 11, wherein the engine adjustment is an adjustment to a shift schedule.

14. The method of claim 11, further comprising receiving internal data from one or more data collectors in the vehicle, and generating the derived datum based on the internal data in addition to the external data.

15. The method of claim 14, wherein the internal data include at least one of an ambient temperature, a barometric pressure, a relative humidity, precipitation data, a sun load, a road grade, a vehicle speed, an air mass in the vehicle engine, an engine coolant temperature, and an air charge temperature.

16. The method of claim 14, further comprising performing a rationality diagnostic with respect to at least one of the external data and the internal data prior to generating the at least one derived datum.

17. The method of claim 16, wherein the rationality diagnostic includes an initial threshold test to determine whether the at least one of the external data and the internal data fall within a possible range of values.

18. The method of claim 16, wherein the rationality diagnostic is used to adjust a weighting of the at least one of the external data and the internal data.

19. The method of claim 14, wherein the internal data is received via a controller area network (CAN) bus in the vehicle, and the external data is received via a wide area network.

20. The method of claim 11, wherein the external data include at least one of an ambient temperature, a barometric pressure, a relative humidity, precipitation data, a sun load, a road grade, a wind velocity, a wind direction, and a vehicle speed.

* * * * *